G. H. STALLMAN.
HOG SCRAPING MACHINE.
APPLICATION FILED AUG. 16, 1920.

1,383,347.

Patented July 5, 1921.
4 SHEETS—SHEET 1.

Inventor:
Granville H. Stallman.

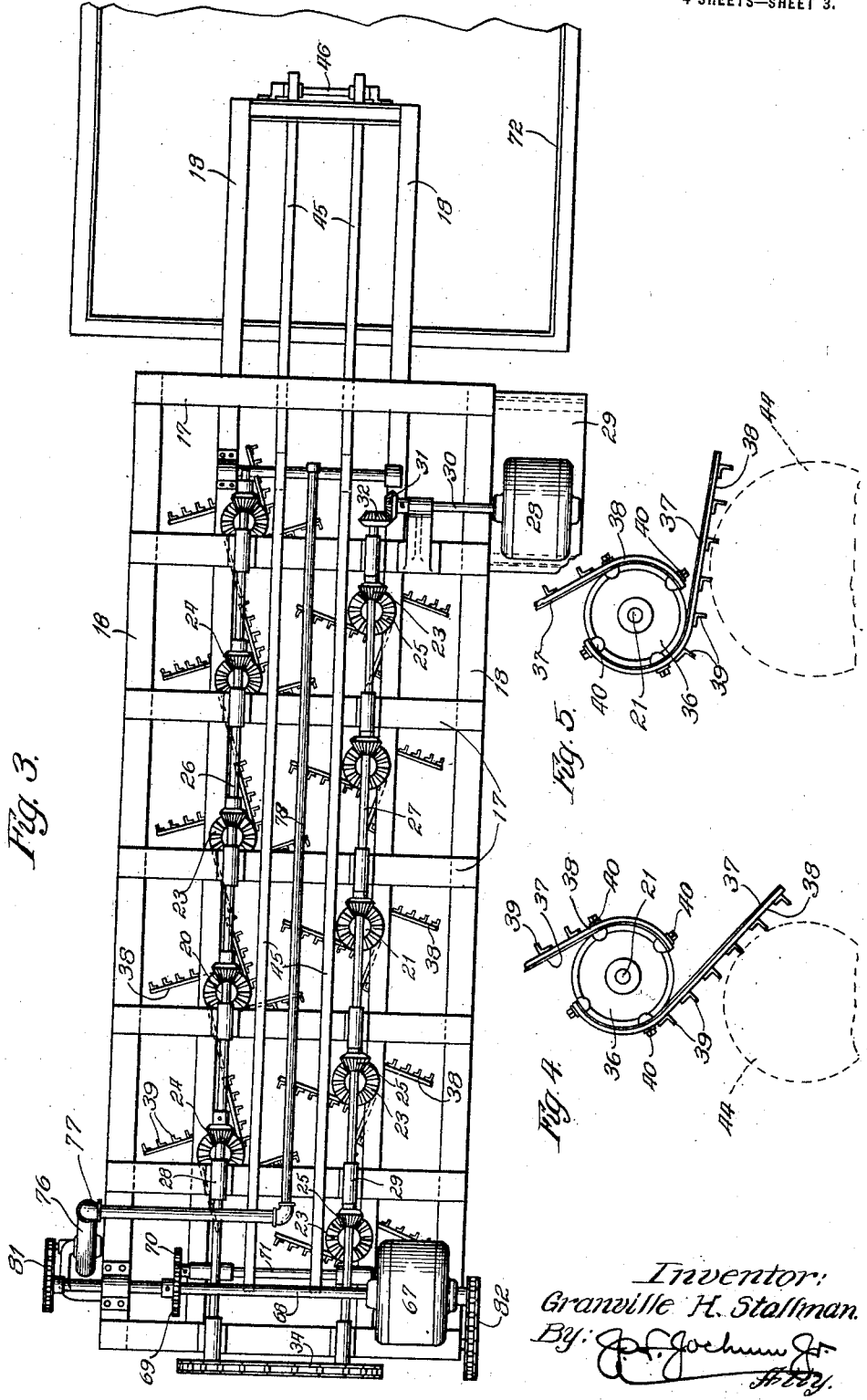

G. H. STALLMAN.
HOG SCRAPING MACHINE.
APPLICATION FILED AUG. 16, 1920.
1,383,347.
Patented July 5, 1921.
4 SHEETS—SHEET 4.
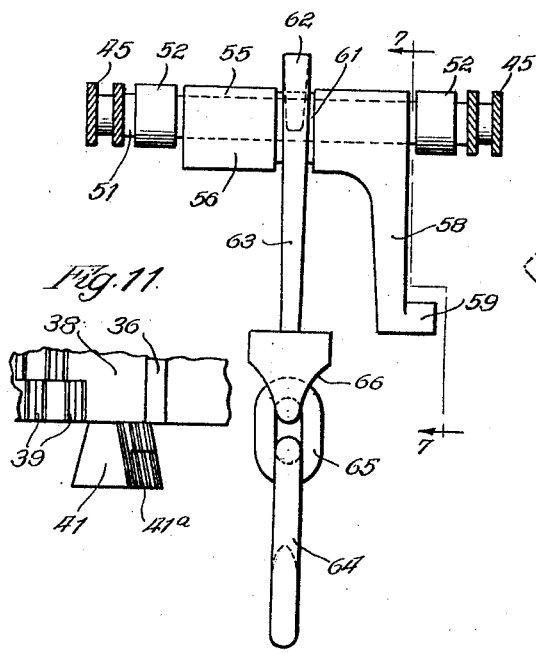
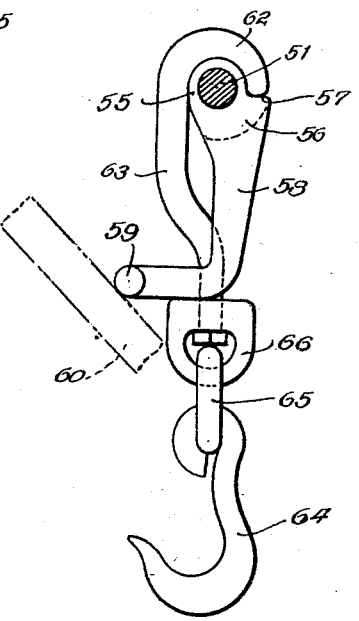
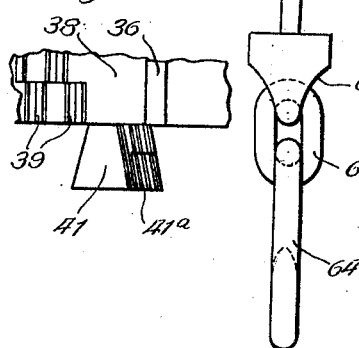
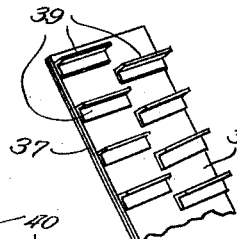
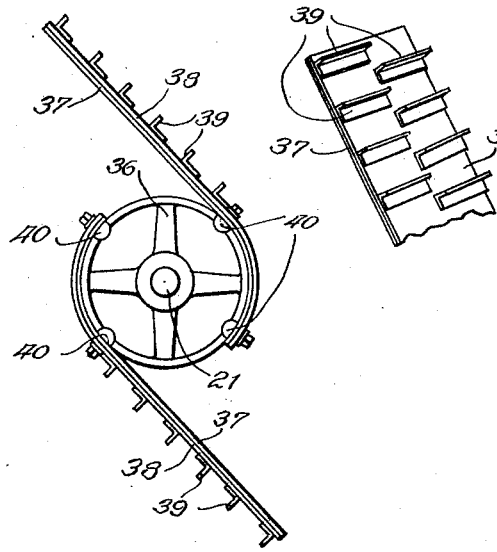
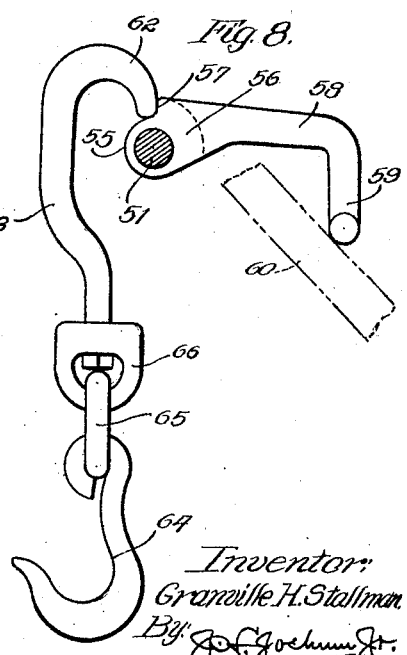
Inventor:
Granville H. Stallman

UNITED STATES PATENT OFFICE.

GRANVILLE H. STALLMAN, OF CHICAGO, ILLINOIS, ASSIGNOR TO THE MECHANICAL MANUFACTURING COMPANY, OF CHICAGO, ILLINOIS, A CORPORATION OF ILLINOIS.

HOG-SCRAPING MACHINE.

1,383,347.                     Specification of Letters Patent.      Patented July 5, 1921.

Application filed August 16, 1920. Serial No. 403,644.

*To all whom it may concern:*

Be it known that I, GRANVILLE H. STALLMAN, a citizen of the United States, residing at Chicago, in the county of Cook and State of Illinois, have invented certain new and useful Improvements in Hog-Scraping Machines, of which the following is a specification.

This invention relates to improvements in hog scraping machines and one of the objects of the same is to provide an improved machine of this character whereby the hair may be scraped from the carcass while being conveyed between suitable scrapers.

Heretofore in machines of this character this result has generally been accomplished by conveying the carcass between a series of beaters which beat against the carcass as they are rotated, with the result that the carcass is very often injured as the beaters strike the carcass with such force that the flesh is lacerated or bruised, furthermore with the prior machines no provision has been made for effectively removing the hair from the head, snout and rump. To overcome these difficulties and objections and to provide an improved machine of this character which will remove the hair by a wiping of the scrapers over the carcass, and in which machine the carcass is alternately given a rotary movement first in one direction and then in the other direction as the scrapers pass thereover, so as not to injure or lacerate the flesh is another one of the objects of the present invention.

A further object is to provide an improved machine of this character having scrapers so arranged that they will pass over the snout of the carcass and also having scrapers so disposed as to effectively wipe over the rump of the carcass while being conveyed through the machine.

A further object is to provide improved means for automatically releasing and delivering the carcass from the conveyer.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which—

Fig. 3 is a top plan view.

Fig. 4 is a diagrammatic view illustrating the action of one of the scrapers.

Fig. 5 is a view similar to Fig. 4 illustrating the action of one of the scrapers when it passes over a larger carcass.

Fig. 6 is a view partly in end elevation and partly in section of a portion of the conveyer and releasing mechanism.

Fig. 7 is a view taken on line 7—7 Fig. 6.

Fig. 8 is a view similar to Fig. 7 showing the parts in a different position.

Fig. 9 is a detail top plan view of one of the scrapers.

Fig. 10 is a detail perspective view of a portion of one of the scrapers.

Fig. 11 is a detail view showing the arrangement of one of the angularly disposed scrapers.

Figure 1:
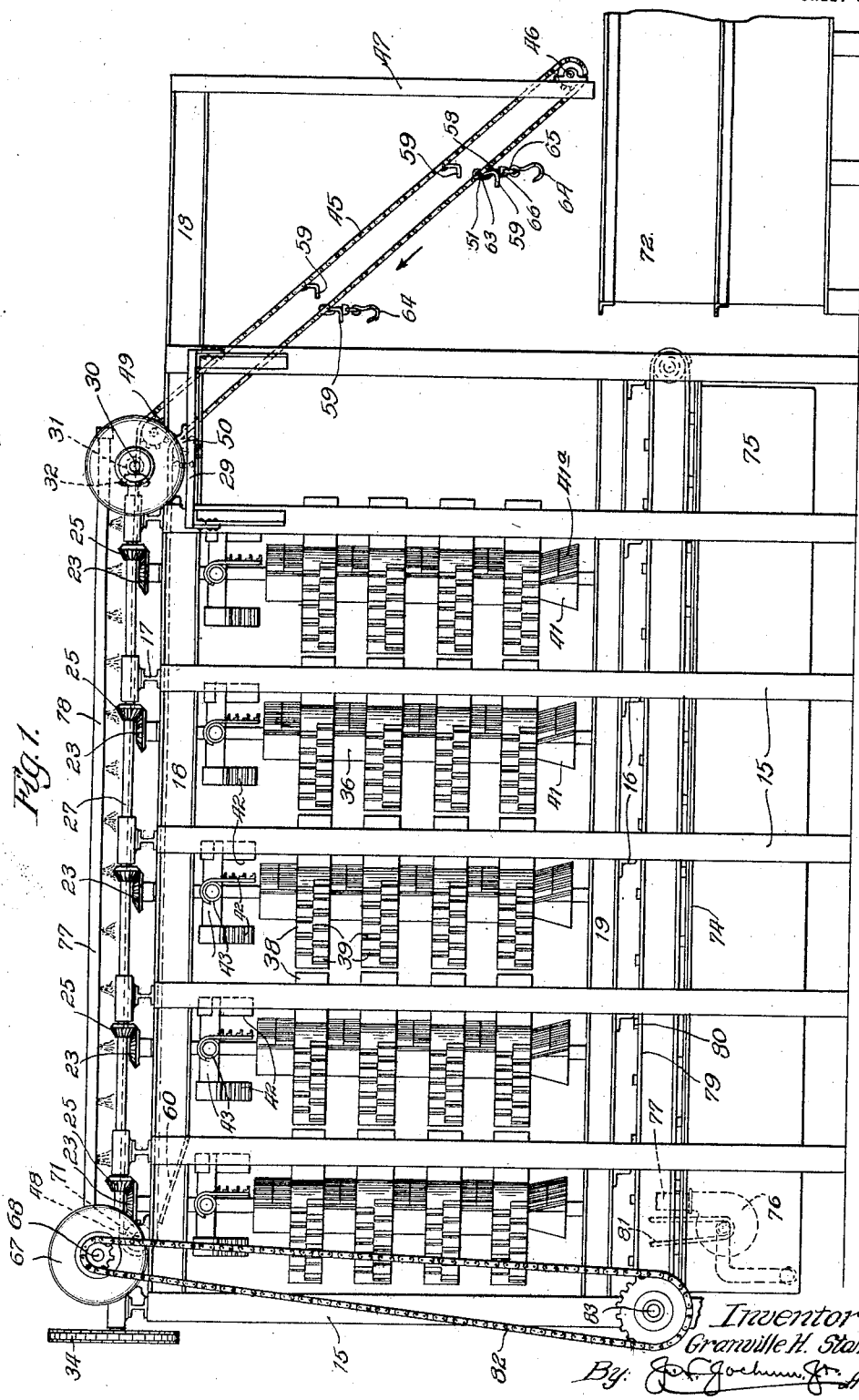
Figure 1 is a side elevation, some of the parts being omitted for the sake of clearness.

Referring more particularly to the drawings there is shown a suitable supporting structure or frame embodying uprights 15, connected by suitable cross members 16—17 all of which may be of any desired size and configuration but the frame is preferably of channel and angle iron construction, suitable braces being provided wherever necessary.

Arranged to extend lengthwise of the structure and preferably spaced from the sides thereof and arranged at the top of the frame are channel irons 18 while similar channel irons 19 are arranged and spaced below the channel irons 18.

Journaled in suitable bearings in the members 18 are two series of shafts 20—21. These shafts are laterally spaced from each other and are arranged so that the shafts of one series will be in a staggered relation to the shafts of the other series and equidistant from each other and the series of shafts are laterally spaced from each other to such an extent as to permit the passage of a carcass therebetween.

The shafts are respectively provided with bevel gears 22—23, the shafts of each series being arranged in alinement. Meshing with the gears 22—23 are bevel gears 24—25 and these gears are respectively connected with shafts 26—27, the shafts being respectively journaled in the bearings 28—29 and are adapted to be rotated so that the rotation of the shaft will through the medium of the respective inter-meshing gears impart a rotary motion to the upright shafts.

These shafts 26—27 are adapted to be rotated in any desired or suitable manner but are preferably rotated by means of a motor 28 upon a suitable supporting bracket 29, the shaft 30 of which motor is connected to a bevel gear 31, which in turn meshes with a bevel gear 32 carried by the shaft 27. The motion of the shaft 27 is transmitted to the shaft 26 in any suitable manner but preferably by means of a sprocket wheel 33 connected with the end of the shaft, preferably the end opposite to the end to which the motor 28 is connected. A sprocket chain 34 passes over the sprocket wheel 33 and also over a sprocket wheel 35 carried by the shaft 26. By the provision of the sprockets at the ends of the shafts opposite to the end at which the motor is located it will be manifest that the strain upon the shafts will be equally distributed.

Connected with each of the upright shafts 20—21 are a series of scrapers and, as the construction of each of the scrapers is the same, the description of one will apply equally as well to them all.

Each of the scrapers embodies a hub 36 which is secured for rotation with the shaft and this hub may be of any desired diameter and of any desired height, but the height of the hub is substantially equal to the width of the scraper, but is such that a plurality of superposed scrapers can be secured to each of the shafts. Connected with each of the hubs are opposed scrapers each of which embodies a body portion 37 constructed of any suitable strong flexible material such as spring steel. Secured to this body portion 37 is a flexible member 38 which is also constructed of any suitable stout, flexible material such as belting and a series of clips 39 preferably in the form of angle irons are secured to the element 38. The clips extend in directions transversely of the body portion 37 and are spaced from each other in directions lengthwise of the body portions. The scraper thus formed is secured by one end by means of clips 40 to the hub and when secured thereto, and the clips 39 terminate adjacent the axis of rotation of the body portion 37. The scraper is of such rigidity that the free ends of the scrapers will normally stand tangential to the hub and their flexibility is such that when the hub is rotated the free ends of the scrapers will be deflected slightly by a centrifugal force and will also be deflected so as to move across and have an extended period of operation upon the carcass when coming into contact therewith, as distinguished from a beating action of the scrapers upon the carcass, and which beating action is the method now employed in machines of this character.

The alternate hubs on each of the shafts are arranged so that the scrapers will be disposed in staggered relation with respect to each other.

Any number of these scrapers may be provided so as to contact with and move across the body of the carcass and in order to effectively scrape and clean the head and snout of the hog, it is necessary that the scrapers adjacent the path of movement of the snout should be disposed in a plane inclined to the axis of rotation of the respective shafts.

Figure 2:
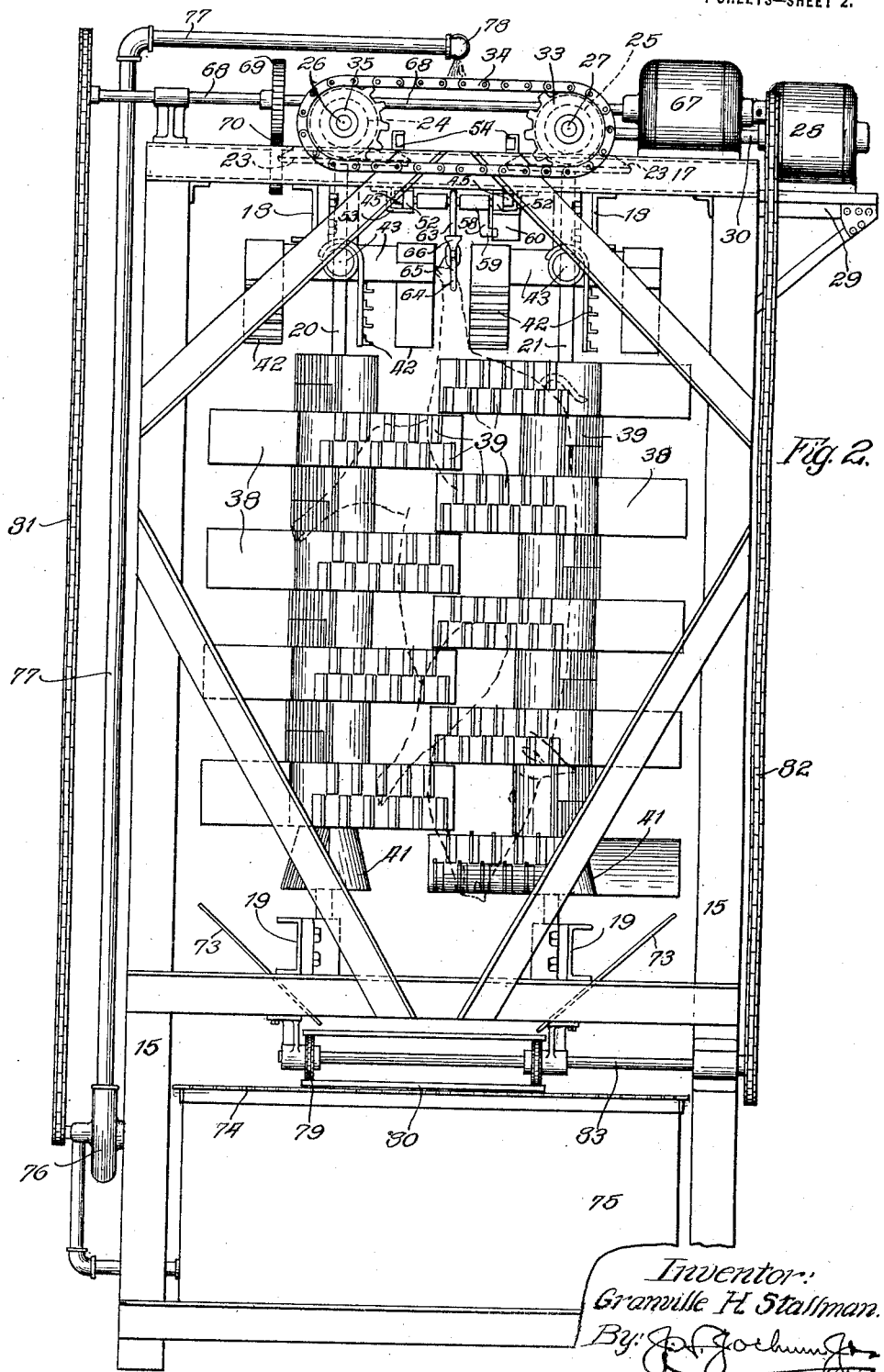
Fig. 2 is an end elevation as taken from the left-hand end of Fig.

To that end the hubs 41 of the lowermost scrapers are preferably of a tapered or frusto-conical shape so that when the scrapers are secured thereto the scrapers will be inclined to the axis of rotation of the shafts as will be clearly seen from Fig. 2. As the shafts are rotated and as these lowermost scrapers are inclined, it will be manifest that when they contact with the snout of the carcass and are deflected about their hubs, the free extremities of the lowermost scrapers will be deflected either upwardly or downwardly according to the position of the scrapers with respect to the shaft.

The uppermost scrapers on each shaft are disposed for a considerable distance below the conveyer, to be hereinafter described, and additional scrapers designated generally by the reference numeral 42 are provided for passing over the rump of the carcass. The construction of each of these scrapers 42 is preferably the same as the remaining scrapers but are secured to the shafts in such a manner that they will be disposed at substantially right angles to the horizontal scrapers. To that end suitable arms 43, which may be of any desired size and configuration, but are preferably constructed of tubular material for the sake of lightness and rigidity, are secured to the shafts 20—21. These arms are preferably of a length so that the arms on one of the shafts will terminate short of the arms on the other shaft when the shafts are rotated and so as not to interfere with the rotation of the shafts or the passage of the carcass therebetween. These scrapers 42 are connected with the arms 43 so as to depend therefrom and to stand above the horizontal scrapers, the scrapers 42 being of such a length that they will be flexed as they contact with the carcass and will engage the rump and pass thereacross.

Obviously the shafts 20—21 may be given any desired speed of rotation.

The carcass designated by the reference numeral 33 and indicated in dotted lines in Fig. 2 may be conveyed between these scrapers in any suitable manner but preferably by means of a conveyer embodying spaced endless chains or belts 45 passing over suitable pulleys 46 connected together and journaled in suitable bearings mounted upon a suitable support 47, preferably carried by the element 18, and also over suitable pulleys or sprockets 48 arranged at the opposite end of the frame.

If desired suitable idle pulleys 49—50 may be provided over which the runs of the conveyer pass.

These conveyers 45 (see particularly Fig. 6) are connected together at any desired intervals by means of a connecting bar or shaft 51 upon each of which is arranged suitable rollers 52 and these rollers run upon suitable guides 53 supported by the framework above the scrapers and extending lengthwise of the frame. Similar guides 54 are also provided for receiving the return run of the conveyer.

Mounted loosely upon each of the connecting bars 51 is an element designated generally by the reference numeral 55 which is provided with an eccentric portion 56 having a shoulder 57. Depending from this element 55 is an arm 58 preferably provided with a laterally offset portion 59 at its extremity, and which portion 59 on the arm 28 is adapted, at a predetermined point in the travel of the conveyer, to engage an inclined or cam surface 60 as shown more clearly in Figs. 7 and 8, so as to rock the element 55 about the bar or shaft 51. The element 55 is preferably provided with a recessed portion 61 intermediate its ends, and in which recessed portion the hook-shaped end 62 of a support 63 is adapted to engage.

This support 63 carries a hook 64 connected by means of a link 65 and swivel 66 thereto and the hook 64 is adapted to engage the tendon in the leg of the carcass for connecting the carcass with the conveyer, as is usual in machines of this character and as illustrated more clearly in Fig. 2.

As the carcass is conveyed between the scrapers and as it reaches the end of the machine, it will be automatically disconnected from the conveyer and delivered from the machine by reason of the fact that the portion 59 of the arm 58 of the element 55 will engage the incline 60 and will rock the member 55 about the element 51 so that the shoulder 57 will operate upon the end of the hook-shaped portion 62 of the element 63 to disengage the hook 64 from the element 55 in the manner shown in Figs. 7 and 8, whereupon the carcass will drop from the conveyer.

This conveyer is adapted to be actuated in any desired or suitable manner but preferably receives its motion from a motor 67 which is separate from the motor 28. The shafts 68 of the motor 67 transmits its motion through the medium of intermeshing gears 69—70 to the shaft 71 of the pulleys or sprockets 48 over which the conveyer belts or chains 45 pass and this motor 67, obviously, may be driven at any desired rate of speed.

It will therefore be seen that with this improved construction, the scrapers are operated by the motor 28 and as the carcass is removed from the tank 72 by reason of the fact that it is connected through the medium of the hook 64 and the associated parts with the conveyer 45, it will be elevated by the conveyer to be conveyed between the scrapers, the latter being operated by the motor 28 will cause the scraper arms to contact with the carcass as it is passing between the scrapers. If the carcass is of a small size, the scraper arms will engage the carcass near the ends of the scrapers but if the carcass is of a larger size it will be engaged by the scrapers nearer the hubs 36.

Inasmuch as the scrapers of the two series are arranged in staggered relation it will be seen that as the carcass first enters the machine it will be conveyed therethrough by the conveyer. As it approaches the first two scrapers the scraper arms will engage the carcass and will wipe across the carcass instead of the carcass being struck by the arms with a beating action. This wiping action of the scrapers across the carcass causes the clips 39 to wipe across the carcass and at the same time the scrapers will assist in drawing the carcass into the machine. As the carcass advances it will pass out of engagement with one of the sets of scrapers on one of the shafts and will be advanced to the next set of scrapers, it being apparent that there will be three sets of scrapers operating upon the carcass at the same time. As the carcass advances the action of two of the scrapers will tend to rotate the carcass in the same direction, but the action of the other scraper tends to rotate the carcass in the opposite direction, thereby causing the carcass to alternately rotate first in one direction and then in the other direction as it advances through the machine. This is due to the fact that there will be at all times two scrapers operating on one side of the carcass while there will be only one scraper operating on the other side and this condition is alternately changed first from one side to the other as the carcass advances.

It will therefore be seen that as the carcass moves through the machine the scrapers will have a wiping effect and all parts of the carcass will come in contact with the scrapers. The vertical depending scrapers 42, during the advancement of the carcass will engage and move across the rump of the carcass and the carcass will be given a slightly lateral swinging movement back and forth between the shafts 20—21 by the pressure of the scrapers against the carcass and this swinging movement is permitted by reason of the swivel connection of the hook 66 with the support 63.

The inclined scrapers 41ᴬ will engage and move across the snout of the carcass as it is being advanced and by the provision of these inclined scrapers, all of the hair will be removed from the head and snout.

After passing between the scrapers, the carcass will be automatically detached from the conveyer in the manner already set forth.

The hair which is removed from the carcass will fall upon suitable inclines 73 to be directed upon a reticulated or perforated support 74 arranged over a suitable tank 75, and which tank contains water for spraying the carcass during its passage through the machine. The water from the tank may be conveyed by means of a suitable pump 76 through a suitable pipe 77 the end 78 of which extends lengthwise of the machine and is provided with suitable apertures through which the water is sprayed. This water serves to wash the carcass as well as convey the hair down upon the reticulated support 74. The water will pass through this support into the tank and the hair may be removed from the support by any suitable means such as a conveyer 79 having suitable scrapers 80 which move across the support 74, as is usual in machines of this character.

The pump 76 may be operated in any suitable manner but preferably is operated from the motor 67 through the medium of a suitable driving chain or belt 81 which passes over suitable pulleys.

The conveyer 79 and scrapers 80 may also be operated in any suitable manner but they are also preferably operated from the motor 67 through the medium of a suitable chain or belt 82 passing over suitable sprockets or pulleys connected respectively with the shaft 83 over which the conveyer 29 passes and also a suitable sprocket connected with the shaft of the motor 67.

With this improved construction it will be manifest that by the provision of the two motors one of which operates the scrapers and the other of which operates the carcass conveyer, the pump, and the hair rake, there will be a considerable saving of power as it necessitates considerably more power to operate the scrapers than the remaining part of the mechanism and it will also be manifest that the motors 28—67 may, if desired, be operated at any relative difference in the degree of speed.

With this improved construction it will be manifest that there are simultaneously brought into contact with the carcass three sets of cleaning or scraper members and their effect is continuous as long as the carcass is within the field of operation of the members. Furthermore there is no lost motion or fanning of the air by the cleaning or scraping members, and these members will not break the bones, bruise the carcass, pull out any of the tendons and the carcass will not be dropped from the conveyer in an attempt to turn the carcass so as to clean all the parts. Due to the motion of the cleaning or scraping members, the carcass is turned alternately as it passes from one set to the other set, thereby materially assisting the cleaning process and producing more efficient results than in machines heretofore constructed and which latter machines turn the carcass only in one direction.

It will be manifest that while the alternating rotation of the carcass is produced by the action of the cleaning members thereupon, there will be no beating or pounding of the carcass thereby, but there will be produced a scraping effect which is automatically increased or diminished by the deflection of the scraper members, in proportion to the size of the carcass being conveyed through the machine and it will also be manifest that carcasses of different sizes may be conveyed through the machine at the same time without impairing the efficiency of the machine. It has been found that owing to the varying conditions of the hogs at certain periods of the year it is frequently necessary to regulate the cleaning or scraping to correspond to the condition of the carcass. By the provision of the separate motors or separate drives herein shown the cleaning may be regulated without any delay in the killing operation or the stopping of the machine.

While the preferred form of the invention has herein been shown and described, it is to be understood that various changes may be made in the details of construction and in the combination and arrangement of the several parts within the scope of the claims without departing from the spirit of this invention.

What is claimed as new is:—

1. A machine of the character described embodying mechanism for removing the hair and for cleaning the carcass, said mechanism embodying spaced vertical shafts between which the carcass is conveyed, a plurality of sets of flexible scrapers connected with each of the shafts and rotatable therewith to engage and move across the carcass, some of the scrapers of each set operating in a plane inclined to the plane of operation of others of the scrapers of the same set and to the axis of rotation of the shaft.

2. A machine of the character described embodying mechanism for removing the hair, said mechanism embodying a plurality of spaced sets of flexible superposed scrapers rotatable about upright axes and between which sets the carcass is conveyed, each set of scrapers embodying a series of superposed scraper elements, certain of said elements of the set being inclined to their axes of rotation, and additional scraper elements coöperating with each set of scraper elements and being disposed transverse thereto.

3. A machine of the character decribed embodying spaced vertical shafts between which the carcass is conveyed, a plurality of superposed sets of flexible scraper elements connected with the shafts and rotatable therewith, the scraper elements adjacent one end of the shafts being inclined to the axis of rotation of the shaft, and the set of scrapers at the other end of the shaft extending in a direction lengthwise of the shaft and operating upon the carcass in a plane transverse to the plane of operation of others of the scrapers, and means for rotating the shafts.

4. A machine of the character described embodying spaced vertical shafts between which the carcass is passed, a plurality of superposed vertical hubs connected with each of the shafts, flexible scraper elements connected with each of the hubs, one or more of the hubs at one end of the shaft being tapered, flexible scraper elements secured to the tapered hubs, and means for rotating the shafts.

5. A machine of the character described embodying spaced vertical shafts between which the carcass is passed, a plurality of superposed vertical hubs connected with each of the shafts, flexible scraper elements connected with each of the hubs, one or more of the hubs at one end of the shaft being tapered, flexible scraper elements secured to the tapered hubs, radial arms connected with the shafts above the said hubs, depending flexible scrapers connected with the arms, and means for rotating the shafts.

6. A machine of the character described embodying a series of vertical shafts, flexible scraper elements connected with the shafts, power mechanism for rotating the shafts, an elevator and conveyer to convey carcasses from a scalding tank through the machine, mechanism for carrying away the hair removed from the carcasses, a pump, a spray pipe connected with the pump, and power mechanism separate from the first recited power mechanism and common to the elevator and conveyer, the hair carrying mechanism and the pump for operating them.

7. A machine of the character described embodying a conveyer, means connected with the conveyer for supporting carcasses, flexible scrapers arranged on each side of the conveyer and adapted to operate on opposite sides of the carcasses with a wiping and scraping movement, the said carcasses being thereby alternately turned in opposite directions during the cleaning thereof, and means operable upon the first recited means for automatically releasing the latter and the carcass from the conveyer at a predetermined point in the travel of the conveyer, the second recited means embodying a hook device engaging over a portion of the conveyer and an automatically actuated cam device for disengaging the said hook device from the conveyer.

8. Carcass handling mechanism embodying a conveyer, said conveyer embodying a supporting element, an element rotatably connected with the supporting element, a suspension element having a hook shaped portion connected with the supporting element, said rotatable element having a shoulder, and means arranged within the path of movement of a portion of the rotatable element by the conveyer and adapted to impart a rotary movement to the second recited element to cause the said shoulder to disengage the said hook shaped portion from the conveyer to release the carcass.

9. Carcass handling mechanism embodying a conveyer, said conveyer embodying a supporting element, an element rotatably connected with the supporting element, a suspension element having a hook shaped portion connected with the supporting element, said rotatable element having a shoulder, and means arranged within the path of movement of a portion of the rotatable element by the conveyer and adapted to impart a rotary movement to the second recited element to cause the said shoulder to disengage the said hook shaped portion from the conveyer to release the carcass, the said means embodying a stationary inclined surface adapted to be engaged by and over which a portion of the said rotatable element passes.

10. Carcass handling mechanism embodying a conveyer, suspension means connected therewith for holding a carcass, the said suspension means embodying a support, an element pivotally mounted upon the support, a suspension hook engaging over the said element, means for moving the element with respect to the support, and means whereby the said movement of said element will cause the said hook to be automatically disengaged therefrom.

11. Carcass handling mechanism embodying a conveyer, suspension means connected therewith for holding a carcass, the said suspension means embodying a support, an element pivotally mounted upon the support, a suspension hook engaging over the said element, an arm connected with said element, a stationary surface over which the said arm is moved by the conveyer to rock the said element with respect to the said support, and means whereby such movement of the said element will disengage the hook therefrom.

12. Carcass handling mechanism embodying a conveyer, suspension means connected therewith for holding a carcass, the said suspension means embodying a support, an element pivotally mounted upon the support, a suspension hook engaging over the said element, a shoulder on said element, and means for moving the said element with respect to the said support to cause the said shoulder to engage the end of the said hook and disengage the hook from the said element.

13. Carcass handling mechanism embodying a conveyer, suspension means connected therewith for holding a carcass, the said suspension means embodying a support, an element pivotally mounted upon the support, a suspension hook engaging over the said element, means for moving the element with respect to the support, and means whereby the said movement of said element will cause the said hook to be automatically disengaged therefrom, the said support and pivotally mounted element being both connected with the conveyer and movable therewith.

In testimony whereof I have signed my name to this specification, on this 13th day of August, A. D. 1920.

GRANVILLE H. STALLMAN.